United States Patent
Winkler

(10) Patent No.: US 7,214,758 B2
(45) Date of Patent: May 8, 2007

(54) RUBBER ADHESIVE COMPOSITION FOR TEXTILE MATERIALS

(75) Inventor: Andrei Winkler, Berkeley Heights, NJ (US)

(73) Assignee: Cytec Technology Corp., Wilmington, DE (US)

( * ) Notice: Subject to any disclaimer, the term of this patent is extended or adjusted under 35 U.S.C. 154(b) by 439 days.

(21) Appl. No.: 10/830,747

(22) Filed: Apr. 23, 2004

(65) Prior Publication Data

US 2005/0239936 A1  Oct. 27, 2005

(51) Int. Cl.
*C08G 8/04* (2006.01)

(52) U.S. Cl. .................. 528/129; 528/165; 528/254

(58) Field of Classification Search .......... 524/323, 524/342–343, 345–348, 354–355; 528/129, 528/165, 254
See application file for complete search history.

(56) References Cited

U.S. PATENT DOCUMENTS

| 2,339,203 | A |   | 1/1944  | Stiegler et al. ............ 8/136 |
|-----------|---|---|---------|-----------------------------------|
| 3,194,294 | A |   | 7/1965  | van Gils .................. 152/330 |
| 3,329,622 | A |   | 7/1967  | Harris et al. .............. 252/192 |
| 3,522,127 | A |   | 7/1970  | Osborne et al. ........... 156/334 |
| 3,748,291 | A | * | 7/1973  | Copley .................... 523/402 |
| 3,834,934 | A |   | 9/1974  | Broisman ................. 117/76 T |
| 4,131,584 | A |   | 12/1978 | Burke, Jr. et al. ....... 260/29.6 N |
| 4,197,219 | A | * | 4/1980  | Damico ..................... 524/462 |
| 4,228,045 | A |   | 10/1980 | Bezwada ................... 260/4 R |
| 4,263,190 | A |   | 4/1981  | Zavisza .................... 260/29.4 |
| 4,292,111 | A |   | 9/1981  | Bezwada ................. 156/307.7 |
| 4,300,964 | A |   | 11/1981 | Chaudhuri .............. 156/110 A |
| 4,339,359 | A |   | 7/1982  | Bezwada ................... 524/512 |
| 5,298,539 | A |   | 3/1994  | Singh et al. ................ 524/92 |
| 5,792,805 | A |   | 8/1998  | Williams ................... 524/100 |
| 5,891,938 | A |   | 4/1999  | Williams ................... 524/100 |
| 2003/0166743 | A1 |   | 9/2003 | Huynh-Tran et al. ...... 523/205 |

FOREIGN PATENT DOCUMENTS

| GB | 1090703 | 11/1967 |
| GB | 1163594 | 9/1969  |
| GB | 1378519 | 12/1974 |

* cited by examiner

*Primary Examiner*—Peter Szekely
(74) *Attorney, Agent, or Firm*—Claire M. Schultz; Fran Wasserman; Robert R. Neller

(57) ABSTRACT

This invention relates to an adhesive composition comprising: an elastomeric latex; a phenol, an aldehyde and an alkylated melamine-formaldehyde resin suitable for use in the adhesion of textile material to rubber. This invention also relates to a method of promoting the adhesion of a textile material to rubber comprising the step of contacting the textile material with an adhesive composition comprising an elastomeric latex; a phenol; an aldehyde; and an alkylated melamine-formaldehyde resin. The adhesive composition of this invention provides equal or better retention of adhesive strength after heat aging.

12 Claims, No Drawings

RUBBER ADHESIVE COMPOSITION FOR TEXTILE MATERIALS

FIELD OF THE INVENTION

This invention is directed to an adhesive composition used to adhere textile material to rubber. More specifically, the invention relates to an adhesive composition comprising an elastomeric latex; a phenol, an aldehyde and a melamine-formaldehyde resin suitable for use in the adhesion of textile material to rubber.

BACKGROUND OF THE INVENTION

Tires are generally made from a composite of rubber compositions and fiber reinforcements made from textile materials such as synthetic polymers. It is important to achieve good adhesion between the textile material and the rubber composition in order to maintain the integrity of the tire. Power drive and under the hood hose applications also need to maintain integrity under high heat conditions.

Two adhesive systems which are widely used for achieving bonding between textile material and rubber compositions are: 1) the Resorcinol-Formaldehyde-Latex (RFL) coating method wherein an RFL adhesive is applied to the tire cord and 2) the Hexamethylenetetramine-Resorcinol or Hexamethoxymethylmelamine-Resorcinol adhesion promoting methods wherein an adhesion promotion system is incorporated into the rubber composition.

Resorcinol is a very expensive compound which exhibits very undesirable toxicological properties. Its use as a compound for the adhesion of textile materials to rubber is problematic because of its offensive odor, difficulty in handling and possible toxic hazards during rubber processing due to excess fuming of resorcinol during the curing or vulcanization process. U.S. Pat. Nos. 4,263,190 and 5,792,805 express the long held desire to reduce or eliminate the use of resorcinol in rubber processing.

The present invention partially relates to the partial replacement of resorcinol-formaldehyde in a RFL adhesive composition with an alkylated melamine-formaldehyde resin to reduce the amount of resorcinol in the RFL adhesive composition and provide similar or better adhesive characteristics to rubber.

U.S. Pat. No. 3,194,294 discloses the use of trimethylol melamine in a RFL adhesive composition to adhere nylon to natural rubber.

U.S. Pat. No. 4,263,190 discloses the use of mixture of an aklylated melamine-formaldehyde resin and a glyoxal-urea reaction product in latex to replace the use of resorcinol-formaldehyde resin in a RFL adhesive composition.

It is believed that none of the above-mentioned documents disclose or suggest the use of an alkylated melamine-formaldehyde resin in a RFL adhesive coating composition.

SUMMARY OF THE INVENTION

This invention relates to an adhesive composition comprising: an elastomeric latex; a phenol, an aldehyde and an alkylated melamine-formaldehyde resin suitable for use in the adhesion of textile material to rubber. This invention also relates to a method of promoting the adhesion of a textile material to rubber comprising the step of contacting the textile material with an adhesive composition comprising an elastomeric latex; a phenol; an aldehyde; and an alkylated melamine-formaldehyde resin.

DETAILED DESCRIPTION OF THE INVENTION

This invention relates to an adhesive composition comprising: an elastomeric latex; a phenol, an aldehyde and an alkylated melamine-formaldehyde resin, which is suitable for use in the adhesion of textile material to rubber.

The term latex is understood to refer to an aqueous dispersion of polymer particles. The elastomer latices employable in this invention, include, but are not limited to Hevea latex, natural rubber, natural rubber lattices grafted with vinyl compounds such as methyl methacrylate, vinylpyridine, etc., and various synthetic rubber latices such as homopolymer latex of a $C_4$ to $C_{10}$ conjugated diene compound, and copolymer lattices obtained by the copolymerization of a $C_4$ to $C_{10}$ conjugated diene with one or more vinyl monomers such as styrene, vinylpyridine, acrylonitrile, acrylic acid, methacrylic acid, alkyl acrylates and alkyl methacrylates and the like. Example of such synthetic rubber latices include, but are not limited to styrene-butadiene copolymer latex, polybutadiene latex, polyisoprene latex, polychloroprene latex, isoprene=isobutylene copolymer latex, butadiene-acrylonitrile copolymer latex, butadiene-methacrylic acid copolymer latex and butadiene-styrene-acrylic acid copolymer latex. A preferred elastomeric latex is a copolymer of a vinylpyridine with a conjugated diolefin having 4 to 6 carbon atoms. Suitable vinylpyridines are 2-vinylpyridine, 2-methyl-5-vinylpyridine and 5-ethyl-2-vinylpyridine.

Particularly preferred are latex compositions comprising a copolymer of 5 to 25% styrene, 50–90% butadiene and 5 to 25% vinlypyridine. These preferred latex compositions may be obtained from Eliokem and Omnova Solutions Inc.

Phenols which may be used in this invention include, but are not limited to: phenol; dihydric phenols such as resorcinol; substituted phenols such as those phenols containing —OH, —NH$_2$ or —OCOCH$_3$ groups, alkylated phenols exemplary of which are $C_1$ to $C_{16}$ alkyl substituted resorcinol (e.g., mono-, bis- or tris-alkyl substituted resorcinol), m-cresol, o-cresol, m-ethylphenol, m-n-propylphenol, m-isopropylphenol, m-n-hexylphenol, m-n-butyl phenol, m-sec-butyl,phenol, m-tert.-butyl phenol, m-amyl phenol and other like phenols, particularly those wherein the alkyl substituent contains from 1 to 16 carbon atoms inclusive; the meta-substituted phenols such as m-aminophenol, resorcinol monoacetate, 1,5-naphthalenediol and the like; meta-substituted alkoxy phenols such as m-methoxy phenol, m-ethoxy phenol, m-n-propoxy phenol and the like, particularly those wherein the alkoxy group contains from 1 to 6 carbon atoms inclusive; as well as those phenols with similar substituents in the para-position (e.g. p-tertiary-butyl phenol) which are suitable for forming novolacs; the polyhydric polynuclear phenols which consist of two or more phenols connected by such groups as methylene, alkylene or sulfone, such as bis(p-hydroxyphenyl)-methane, 2,2-bis(p-hydroxyphenyl)propane and dihydroxydiphenyl sulfone and the like; and the halogenated phenols and polynuclear phenols including the meta-halogenated phenols such as m-chlorophenol, m-bromophenol and the like. Preferred phenols are resorcinol and $C_1$ to $C_{16}$ alkyl substituted resorcinol such as mono-, bis- or tris-alkyl substituted resorcinol.

Suitable aldehydes that may be used in this invention include formaldehyde in any of its available forms, (e.g., formalin, paraformaldehyde and trioxane), furfural, glyoxal, acrolein and the like. Also suitable are alkylaldehydes. Non-limiting examples of alkylaldehydes that may be used in this invention are acetaldehyde, propionaldehyde, n-butyraldehyde, isobutyraldehyde, valeraldehyde, chloral, caproaldehyde, octylaldehyde and crotonaldehyde. The preferred aldehyde is formaldehyde in any of its forms.

The term "phenol-aldehyde" resin as used herein means an acid or basic catalyzed phenolic resin which consists essentially of the reaction product of a phenol or substituted phenol and an aldehyde. The resin forming reaction is preferably carried out in water with the aid of an alkali metal hydroxide or carbonate such as sodium hydroxide or sodium carbonate; or with aqueous ammonia; or with a water soluble or dispersible amine such as monoethanolamine, diethanolamine, triethanolamine, and/or the unsaturated amines such as diallylamine, triallylamine, and the vinylamine monomers, e.g. t-butylaminoethyl methacrylate and dimethylaminoethyl methacrylate. The phenol-aldehyde resin is preferably a resorcinol-formaldehyde resin ("RF resin") typically used in the rubber manufacturing and textile process trades.

A preferred RF resin is a pre-condensate RF resin which contains stoichometrically less formaldehyde than resorcinol. This leads to a more stable and easier handling product than a product containing substantially equal molar amounts of formaldehyde and resorcinol. The pre-condensate RF resin may be directly admixed with the other components in the adhesive composition, or admixed with more formaldehyde either before or concurrently with the other adhesive composition components.

The alkylated melamine-formaldehyde resins used in the practice of the invention include those produced by condensing melamine and formaldehyde and defined by the following formula:

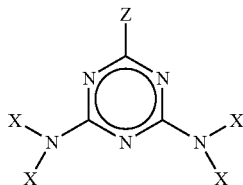

wherein Z is selected from the group consisting of: —N(X)(X), aryl having 6 to 18 carbon atoms, alkyl having 1 to 18 carbon atoms and an acetyl group; each X is independently selected from hydrogen, hydroxymethyl, or alkoxymethyl (1 to 6 alkoxy carbon atoms), with the proviso that the molecule must contain at least one alkyl group and at least two groups derived from formaldehyde. The condensates are well-known and prepared by well-known methods. They are described in U.S. Pat. Nos. 2,339,203 and 3,329,622, among others, hereby incorporated herein by reference. In general, from about 2 to 6 molar proportions of formaldehyde are reacted together with one molar proportion of melamine to form a condensate which may be further condensed with about 1–6 molar proportions of a lower ($C_1$ to $C_6$) alcohol to give an etherified polymethylol melamine. Preferably, the alcohols used in the etherification reaction are methanol, butanol or mixtures thereof.

Commercial examples of alkylated melamine-formaldehyde resins are the Cyrez® resins from Cytec Industries Inc.

The melamine-formaldehyde resin may also be defined in this invention as compositions having the formula range:

$$MF_{2-6} R_{1-6}$$

wherein M=melamine, F=formaldehyde, and R=alkyl ($C_1$–$C_6$) and the ratio of R/F is 0.33 to 1. For example, a melamine-formaldehyde resin composition having the formula $MF_5 Me_4$ contains 1 mole melamine, 5 moles of formaldehyde and 4 moles of methanol. In other words, a $MF_5 Me_4$ means a melamine-formaldehyde resin composition having, on average, 1 mole of hydroxymethyl groups, and 4 moles of methoxymethyl groups per mole of melamine.

In actuality, the melamine-formaldehyde resin will typically self condense such that melamine rings are joined by a methylene or methylene-oxy bridge. This is reflected in the term degree of polymerization (DP). A DP of 1 would mean a complete monomeric melamine structure. A DP of 2 indicates, on average, 2 melamine rings are joined by a methylene or methylene-oxy bridge (i.e., a dimer). A DP of 1.5 would mean, on average, that half the melamines are dimers and half are monomers. Typically, melamine-formaldehyde resins have a DP of 1 to 3, more typically 1 to 2.

The melamine-formaldehyde resins are preferably employed as aqueous solutions, and range from liquid materials to resinous reaction products.

Preferred melamine-formaldehyde resins are high imino melamine-formaldehyde resins which are defined as compositions having the formula range:

$$MF_{2-5} R_{1-5}$$

wherein the ratio of R/F is about 0.33 to 1. Preferably the formula for the high imino melamine-formaldehyde resin is $MF_{2.5-5} R_{1.5-5}$ or $MF_{2.8-4.5} R_{1.5-4.0}$.

Also preferred is a mixture of a high imino melamine-formaldehyde resin and a highly alkylated melamine-formaldehyde resin. A highly alkylated melamine-formaldehyde resin is defined in this invention as a composition having the formula range:

$$MF_{5-6} R_{4-6}$$

wherein the ratio of R/F is about 0.75 to 1. The ratio of the high imino melamine-formaldehyde resin to the highly alkylated melamine-formaldehyde resin in the mixture may range from a low of about 1:1 or about 2:1 or about 3:1 or about 5:1 to a high of about 10:1 or about 20:1 or about 100:1.

The adhesive composition of the present invention may be prepared by admixing the elastomeric latex; phenol, aldehyde and the alkylated melamine-formaldehyde resin together at a temperature of about 10° C. to about 60° C. or about 20° C. to about 40° C. for about 1 to about 24 or about 4 to about 24 hours. Preferably, a phenol-aldehyde resin (e.g., a RF resin or pre-condensate RF resin) is first formed separately then admixed with the other components.

The amount of elastomeric latex in the adhesive composition ranges from a low of about 50%, or about 60% or about 65% by weight, to as high as about 85% or about 90% or about 95% by weight, based on the total weight of the adhesive composition. Preferably the amount of elastomeric latex in the adhesive composition is about 80% to about 85% by weight, based on the total weight of the adhesive composition.

The total amount of the other components (e.g., the phenol, aldehyde and alkylated melamine-formaldehyde resin) may range from about 5% to about 50%, based on the total weight of the adhesive composition.

The ratio of alkylated melamine-formaldehyde resin to the amount of phenol and aldehyde together in the adhesive composition may range from as low of about 0.1:1, or about 0.2:1, or 0.25:1 or about 0.5:1 to as high of about 10:1, or about 5:1, or about 4:1 or about 2:1 by weight.

The molar ratio of aldehyde to phenol in the adhesive composition may range from about 1:1, or about 1.2:1 or about 1.4:1 to as high as about 2.2:1, or about 2:1 or about 1.8:1.

One embodiment of the present invention is to contact or coat textile materials with the adhesive composition of the present invention. The generic term "textile material" as used herein is applicable to natural and synthetic fibrous materials, e.g. reinforcing material in the form of filament, yarn, cord, cable, ribbon, and cord fabric unwoven or woven as cloth or canvas to be used in reinforcing rubber articles such as vehicle tires, mechanical rubber goods such as belts (e.g., conveyor and power transmission), hose, gaskets, and the like, or as carrier sheet for adhesive material for interposition between other substrates to be bonded together. Such textile materials may consist of cotton; cellulose, (e.g., rayon or viscose rayon); cellulose acetate; organic esters and ethers of cellulose; polyesters such as ethylene glycol terephthalic acid polyesters; the polyvinyls and/or polyvinylidenes such as the acrylonitrile polymers, polyvinyl chloride and vinylidene chloride polymers; polyethylenes and other polyolefins; polyurethanes; proteins; alginates; mineral fibers (fiberglass); carbon fibers; polyamides (e.g., nylon and aramids); polyvinyl alcohol; and combinations of two or more different fibers, e.g., in the same yarn or fabric.

The textile material and the adhesive composition, i.e., "reinforcing material" of the present invention may be contacted by any suitable method such as dipping, spraying, brushing or padding. The reinforcing material is heated to a temperature of about 100° C. to about 300° C. or about 150° C. to about 250° C. for up to about 2 or about 5 or about 10 or about 30 minutes. The length of time and temperature are dependent on each other (i.e., shorter times require higher temperatures).

The reinforcing material is then contacted with a rubber composition. The term "rubber" as used herein to designate elastomeric materials or rubbery materials including natural rubbers and the synthetic rubbers which are capable of being cured or vulcanized, as by the aid of heat and suitable vulcanizing agents. Such rubbers include, but are not limited to homopolymers and copolymers of conjugated dienes such as polychloroprene, polybutadiene, polyisoprene; copolymers of chloroprene, butadiene and isoprene with vinyl monomers such as the copolymers of butadiene-styrene, butadiene-acrylonitrile and the like; copolymers of isobutylene and isoprene (the butyl rubbers); copolymers of ethylene and propylene; and terpolymers of ethylene, propylene and a non-conjugated diene and other elastomers, e.g. fluorocarbon elastomers.

The rubber composition to which the reinforcing material is contacted may contain, in addition to the rubbers mentioned above, conventional compounding ingredients such as carbon black, antioxidants, sulfur, zinc oxide, accelerators, high surface area silica (including mixtures thereof with carbon black), processing and softening oils, melamine-formaldehyde adhesion promoters (such as Cyrez® resins from Cytec Industries), and the like.

The rubber composition and reinforcing material are then vulcanized at a temperature of preferably above about 100° C. or above about 120° C. or more preferably about 150° C. to about 220° C., for about 1 to 60 minutes to obtain the reinforced vulcanized rubber composition. The vulcanization can be conducted by press vulcanization, steam vulcanization and other suitable methods of vulcanization.

The present invention will now be illustrated by the following examples. The examples are not intended to limit the scope of the present invention. In conjunction with the general and detailed descriptions above, the examples provide further understanding of the present invention.

EXAMPLES

Comparative Example 1

Standard RFL Dip Solution

To 446 g of water was added 4.99 g of 50% sodium hydroxide followed by 32.3 g of 75 wt % resorcinol-formaldehyde resin (Penacolite® Resin R2170, product of Inspec Corp.) and an additional 16.9 g of a 37 wt % aqueous formaldehyde solution containing 15 wt % methanol as stabilizer. This RF solution was mixed for 30 minutes at ambient temperature and the pH was adjusted to approximately 10.5 with ammonium hydroxide to give 500 g of a 6.6 wt % solids resin solution.

A latex solution was prepared by adding 21.2 g of water to 481 g of 41 wt % vinyl pyridine SBR latex under mixing. To the latex solution was added 498 g of the above RF solution and the combined mixture was stirred for 16 hours at ambient conditions to afford a 1000 g of a 23.0 wt % RFL dip solution.

Example 1

Preparation of RFL Dip Solution with MF Resin

The RFL solution with MF resin of the present invention was prepared similar to Comparative Example 1 except that some of the resorcinol was replaced with MF resin. To 1115 g of water was added 8.75 g of 50% sodium hydroxide followed by 82.8 g of 75 wt % resorcinol-formaldehyde resin (Penacolite® Resin R2170) and an additional 43.3 g of a 37 wt % aqueous formaldehyde solution containing 15 wt % methanol as stabilizer. This solution was mixed for 30 minutes at ambient temperature and then the pH was adjusted to approximately 10.5 with ammonium hydroxide to give 1250 g of a 6.6 wt % solids resin solution.

A latex solution was prepared by adding 566 g of water to 1777 g of a 41 wt % vinyl pyridine SBR latex under mixing. To this latex solution was added 1157 g of the above RF solution and the combined mixture was stirred for 16 hours under ambient conditions to afford 3500 g of a RFL solution.

To 3299 g of the RFL solution was added 201 g of a 23 wt % solution of a high imino alkylated MF resin ($MF_{3.2}Me_{1.6}$). The RFL solution with MF resin was mixed for 10 minutes to afford a 23.0 wt % RFL dip solution.

Example 2

Preparation of RFL Dip Solution with MF Resin Blend

The procedure of Example 1 was followed with the exception that 201 g of a 23 wt % 80/20 blend of a high imino melamine-formaldehyde resin ($MF_{3.2}Me_{1.6}$) and a highly alkylated melamine-formaldehyde resin ($MF_{5.8}Me_{5.0}$) was used in place of the high imino alkylated RF resin alone.

Comparative Example 3

Modified RFL Dip Solution

The procedure of Comparative Example 1 was followed except that 59.3 wt % of an alkyl substituted resorcinol-formaldehyde resin in place of the resorcinol-formaldehyde resin and no sodium hydroxide was used.

To 438 g of water was added 45.2 g of 59.3 wt % of an alkyl substituted resorcinol-formaldehyde resin (Grenbond® from Carboshale AS) followed by 16.7 g of 37 wt % aqueous formaldehyde solution containing 15 wt % methanol as stabilizer. This RF solution was mixed for 30 minutes at ambient temperature and the pH was adjusted to approximately 10.5 with ammonium hydroxide to give 500 g of a 6.6 wt % solids resin solution.

A latex solution was prepared by adding 21.2 g of water to 481 g of a 41 wt % vinyl pyridine SBR latex under mixing. To the latex solution was added 498 g of the above RF solution and the combined mixture was stirred for 16 hours at ambient conditions to afford a 1000 g of a 23 wt % RFL dip solution.

Example 3

Preparation of Modified RFL Dip Solution with MF Resin

The RFL solution with MF resin of the present invention was prepared similar to Comparative Example 3 except that some of the resorcinol was replaced with the MF resin.

To 1095 g of water was added 113 g of 59.3 wt % of an alkyl substituted resorcinol-formaldehyde resin (Grenbond® from Carboshale AS) followed by 41.8 g of 37 wt % aqueous formaldehyde solution containing 15 wt % methanol as stabilizer. This RF solution was mixed for 30 minutes at ambient temperature and the pH was adjusted to approximately 10.5 with ammonium hydroxide to give 1250 g of a 6.6 wt % solids resin solution.

A latex solution was prepared by adding 566 g of water to 1777 g of a 41 wt % vinyl pyridine SBR latex under mixing. To the latex solution was added 1157 g of the above RF solution and the combined mixture was stirred for 16 hours under ambient conditions to afford 3500 g of a RFL solution.

To 3287 g of the above RFL solution was added 213 g of a 23 wt % solution of a high imino melamine-formaldehyde resin ($MF_{3.2}Me_{1.6}$). The RFL solution with MF resin was mixed for 10 minutes to afford a 23.0 wt % RFL dip solution.

Example 4

Preparation of Modified RFL Dip Solution with MF Resin Blend

The RFL solution with MF resin blend of the present invention was prepared similar to Example 3 except that 213 g of a 23 wt % 80/20 blend of mixture of a high imino melamine-formaldehyde resin ($MF_{3.2}Me_{1.6}$) and a highly alkylated melamine-formaldehyde resin ($MF_{5.8}Me_{5.0}$) was used in place of the high imino alkylated MF resin

Example 5

Textile Dipping Procedure

Square woven polyester fabric was cut into 12×18 inch pieces and placed into the RFL dip solution of Examples 1 to 4 and Comparative Examples 1 and 3 until equilibrium uptake was established. The fabric was removed and the excess RFL solution was allowed to drain off. The fabric was then placed on a stretching rack and dried in a forced air oven approximately 1 to 1.5 minutes per side at 65–70° C. The fabric was then baked for 140 sec at 230° C. The treated fabric was allowed to cool and was then cut into 8×10 inch pieces.

Example 6

Preparation of Rubber Compound for Bonding Examples

The rubber compound to which the textile cords are bonded in following Examples 8 to 13 is a polyester carcass formulation prepared by standard mixing and calendared to 0.030 inch thickness using the following formulation. The calendared rubber was cut into 8×10 inch pieces.

TABLE 1

Rubber Compound Formulation

| Component | Parts by weight |
|---|---|
| SIR 10 Natural Rubber | 25.0 |
| BR 1203 Polybutadiene | 25.0 |
| SBR 1500 | 50.0 |
| N330 Carbon Black | 50.0 |
| Napthenic Oil | 10.0 |
| Zinc Oxide Kadox 920 | 3.00 |
| Stearic Acid | 1.00 |
| Agerite Resin D (from RT Vanderbilt) | 1.00 |
| Sulfur | 3.12 |
| Accelerator CBS | 1.30 |
| Total parts per hundred resin | 169.42 |

The scorch time and Tc 90 time were determined as 4.61 and 15.69 minutes using a rotorless cure meter under ASTM D 5289-95.

Example 7

Construction of Test Bonded Samples for Adhesion Testing

The adhesion test specimens were prepared by making a five-ply part by laying up rubber, fabric, rubber, fabric, rubber. A 1 inch wide strip of aluminum foil was placed along one edge between the second and third layers to provide a opening for tensile testing grips. Two or three pieces of string were placed on each rubber surface to allow air to bleed out during cure, and each side was covered with a Mylar sheet.

The adhesion specimens were placed on a positive press platen curing press with 0.082 inch spacers on each edge. The samples were cured at 160° C. and 20,000 psi for 17 minutes. After curing, the specimens were allowed to cool and were then cut into 1×8 inch tensile test specimens insuring that the aluminum strip is on the one inch edge of the test specimen.

Examples 8 to 13

Adhesion Testing

The test specimens were separated at the aluminum strip and placed in an Instron tester. The samples were pulled ⅓ of length to determine initial adhesion data such as initial room temperature (RT) peel, or 100° C. peel where the sample was heated to 100+ C. and pulled at that temperature. The aged test specimens were aged for 72 and/or 168 hrs at 100° C. The aged samples were allowed to cool and pulled another ⅓ of length for aged adhesion data. The test specimen can be either aged again or the remaining ⅓ used for determining adhesion under elevated test conditions. See Table 2 for the averages of the tensile data in pounds per linear inch (pli) for three or six test specimens. The 168 hour aged adhesion data for Example 2 is within experimental error of Comparative Example 1 and the aged adhesion data for Example 4 is within experimental error of Comparative Example 3. The data also shows that the adhesive compositions of this invention provide equal or better retention of adhesive strength after heat aging.

TABLE 2

Adhesion Testing Results

| | Example | | | | | |
|---|---|---|---|---|---|---|
| | 8 | 9 | 10 | 11 | 12 | 13 |
| RFL Solution Example | Comp. 1 | Ex. 1 | Ex. 2 | Comp. 3 | Ex. 3 | Ex. 4 |
| Adhesion Properties Measured at RT | | | | | | |
| T-peel adhesion unaged | 39 pli | 37 pli | 33 pli | 39 pli | 42 pli | 36 pli |
| T-peel after 168 hrs at 100° C. | 48 pli | 30 pli | 46 pli | 44 pli | 36 pli | 44 pli |
| % Retention | 123 | 81 | 139 | 113 | 86 | 122 |
| Adhesion Properties Measured at 100° C. | | | | | | |
| T-peel adhesion unaged | 35 pli | 30 pli | 30 pli | 34 pli | 25 pli | 32 pli |
| T-peel after 168 hrs at 100° C. | 29 pli | 19 pli | 26 pli | 27 pli | 17 pli | 25 pli |
| % Retention | 83 | 63 | 87 | 79 | 68 | 78 |

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An adhesive composition comprising:
   (a) an elastomeric latex;
   (b) a phenol-aldehyde resin;
   (c) a high imino melamine-formaldehyde resin; and
   (d) a highly alkylated melamine-formaldehyde resin,
   wherein the ratio of said high imino melamine-formaldehyde resin to said highly alkylated melamine-formaldehyde resin is about 1:1 to about 100:1.

2. The adhesive composition of claim 1, wherein the ratio of said high imino melamine-formaldehyde resin to said highly alkylated melamine-formadehyde resin is about 2:1 to about 20:1.

3. A method of promoting the adhesion of a textile material to rubber comprising the step of contacting said textile material with the adhesive composition of claim 1.

4. A method of promoting the adhesion of a textile material to rubber comprising the step of contacting said textile material with the adhesive composition of claim 2.

5. The method of claim 3, wherein said phenol-aldehyde resin is a resorcinol-formaldehyde resin.

6. The method of claim 3, wherein said phenol-aldehyde resin is an alkyl substituted resorcinol-formaldehyde resin.

7. The method of claim 4 wherein said phenol-aldehyde resin is a resorcinol-formaldehyde resin.

8. The method of claim 4, wherein said phenol-aldehyde resin is an alkyl substituted resorcinol-formaldehyde resin.

9. The method of claim 3, further comprising the step of contacting the textile material and adhesive composition with a rubber.

10. The method of claim 4, further comprising the step of contacting the textile material and adhesive composition with a rubber.

11. The adhesive composition of claim 1, wherein the phenol-aldehyde resin is a resorcinol-formaldehyde resin.

12. The adhesive composition of claim 1, wherein the phenol-aldehyde resin is an alkyl-substituted resorcinol-formaldehyde resin.

* * * * *